Nov. 17, 1953  A. J. SHMIDL  2,659,659
AMMONIUM SULFATE PRODUCTION
Filed Dec. 7, 1950
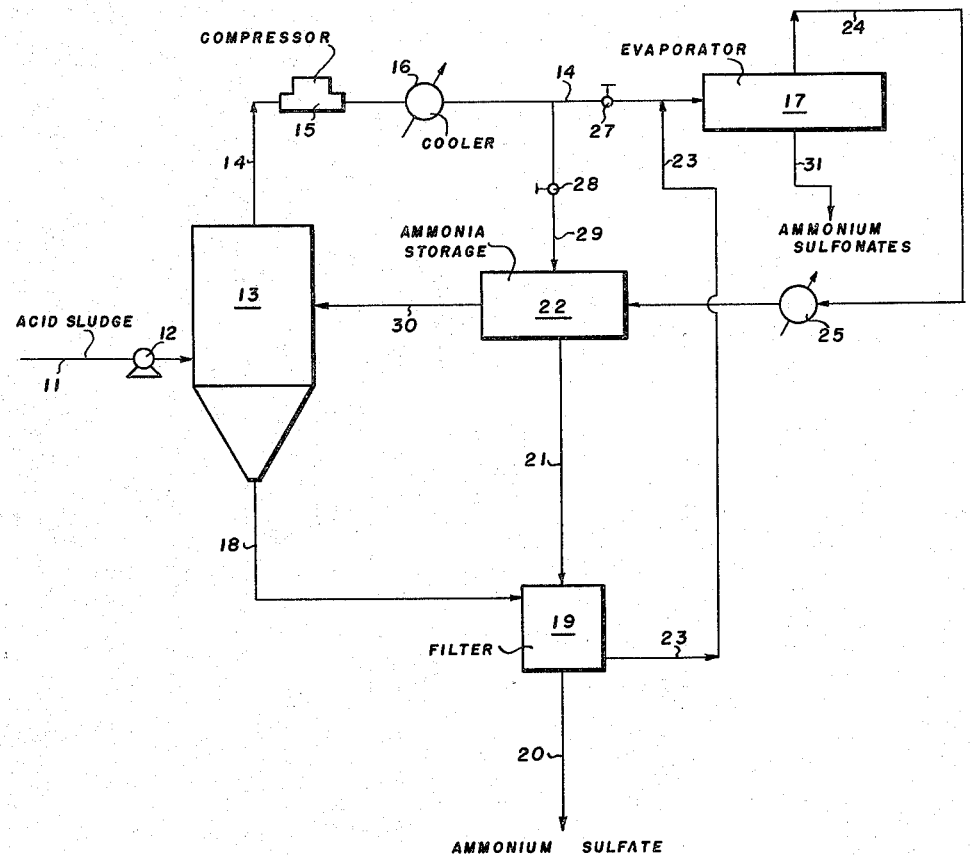
INVENTOR.
Albert J. Shmidl,
BY
AGENT.

Patented Nov. 17, 1953

2,659,659

UNITED STATES PATENT OFFICE 2,659,659

AMMONIUM SULFATE PRODUCTION

Albert J. Shmidl, Houston, Tex., assignor, by mesne assignments, to Standard Oil Development Company, Elizabeth, N. J., a corporation of Delaware Application December 7, 1950, Serial No. 199,667

7 Claims. (Cl. 23—119)

1

The present invention is directed to the production of ammonium sulfate suitable for use as a commercial fertilizer from sulfuric acid sludges containing dissolved carbon compounds. More particularly, the invention is directed to the production of substantially carbon-free ammonium sulfate from sulfuric acid sludges containing sulfonic acid bodies.

The invention may be described briefly as involving the admixing of sulfuric acid sludge containing dissolved carbon compounds, such as sulfonic acid bodies and alkyl sulfates, with anhydrous liquid ammonia under conditions to cause reaction of the sludge and liquid ammonia to form a product including a slurry of ammonium sulfate crystals in a liquid ammonia solution of ammonia soluble compounds. The product is subjected to a separation operation, such as filtration, centrifugation or decanting to recover the ammonium sulfate substantially free of carbon from the solution of ammonia soluble carbon compounds in the ammonia.

The separated ammonium sulfate crystals may be subjected to a washing operation with additional quantities of liquid ammonia to remove traces of ammonia soluble carbon compounds while the solution of ammonia soluble carbon compounds may be subjected to an evaporation treatment to evaporate liquid ammonia therefrom and to recover the ammonia soluble carbon compounds. These latter compounds are believed to be ammonium sulfonates which have wetting and emulsifying properties.

The admixture of anhydrous liquid ammonia is maintained under a suitable pressure to provide a liquid phase and the liquid ammonia is allowed to evaporate to maintain a reaction temperature below 125° F. A suitable reaction temperature may be in the range from 100° to 125° F.

The product including the slurry of ammonium sulfate in ammonia which is subjected to a separation treatment should contain at least 1 volume of liquid ammonia based on the sludge. The amount of liquid ammonia admixed with the sulfuric acid sludge originally should be in excess of one volume and preferably should be in a ratio in the range of 3 volumes of ammonia to 1 volume of sulfuric acid sludge. These amounts will provide a sufficient amount of ammonia to carry the slurry from the reaction vessel.

The sulfuric acid sludge employed in the practice of the present invention may suitably be the spent sulfuric acid sludge derived from the alkylation of isoparaffins with olefins in the presence of strong sulfuric acid. Such sludges are described in the patent to Wadley and Horeczy, 2,425,584 of August 12, 1947. These sulfuric acid sludges contain water in an amount in the range of 1% or 2% and carbon compounds from about 5% to about 15%. The acidity of such acids ranges from 85% to 90% $H_2SO_4$.

Also suitable in the practice of the present invention are the sulfuric acid sludges resulting from the treatment of aromatic concentrates with sulfuric acid to remove traces of olefins therefrom. For example, xylene and toluene-containing fractions may be treated with amounts of strong sulfuric acid ranging from 10 to 18 pounds per barrel of aromatic concentrate to form a sludge which may serve as a feed stock in the present invention. Also suitable in the practice of the present invention are the sulfuric acid sludges resulting from the treatment of thermally and catalytically cracked naphtha with strong sulfuric acid.

The present invention will now be described in more detail by reference to the drawing in which the single figure represents a preferred mode of the invention. Referring now to the drawing, numeral 11 designates a charge line through which a sulfuric acid sludge containing dissolved carbon compounds is introduced into the system from a source not shown and is pumped by pump 12 into a reaction vessel 13 wherein there is maintained a body of anhydrous liquid ammonia at a temperature below 125° F. Reactor 13 is provided with line 14 containing a compressor 15 and a cooler 16. Vaporous ammonia is removed from the mixture of sulfuric acid sludge and anhydrous ammonia in vessel 13 to remove the heat of reaction and maintain the reaction temperature below 125° F. The vaporous ammonia after compression to liquefy same is cooled in cooler 16 and is discharged by line 14 into evaporator 17.

The product containing a slurry of ammonium sulfate crystals in liquid ammonia and a solution of ammonia soluble carbon compounds in liquid ammonia is discharged from reaction vessel 13 by line 18 into a separation zone 19 which suitably may be a filter or a centrifuge. Alternatively, the separation zone 19 may be a decanter. For purposes of this description it is assumed that separation zone 19 is a filter of the rotary or leaf type. In separation zone 19 the ammonium sulfate crystals are removed from the slurry in liquid ammonia and from the solution of ammonia soluble carbon compounds and withdrawn from the system through line 20 as crystalline ammonium sulfate substantially free of carbon. The cake formed in filter 19 may be washed with liquid ammonia introduced in filter 19 by line 21 from ammonia storage tank 22. The filtrate containing ammonia and ammonia soluble carbon compounds is discharged from filter 19 by line 23 into line 14 from whence it is routed into evaporator 17.

In evaporator 17 the temperature and/or pressure is controlled to allow removal of ammonia therefrom by line 24 which on passage through cooler 25 is liquefied and then discharged by line 26 into ammonia tank 22.

It may be desirable under some conditions for the ammonia removed from reactor vessel 13 by line 14 to be discharged into ammonia storage tank 22 rather than into evaporator 17. When this condition prevails, valve 27 in line 14 is closed and valve 28 in branch line 29 is opened allowing the liquefied ammonia in line 14 to be discharged into tank 22. Anhydrous liquid ammonia in reaction vessel 13 is supplied from storage tank 22 by line 30.

On evaporation of ammonia from the solution in evaporator 17 the ammonia soluble carbon compounds are recovered from evaporator 17 by line 31. These compounds are believed to comprise ammonium sulfonates and may find use as wetting and/or emulsifying agents while the ammonium sulfate recovered by line 20 is substantially free of carbon and is of a substantially white crystalline nature.

As a further illustration of the present invention, sulfuric acid sludge resulting from the alkylation of isobutane with butylenes which contained 4.3% by weight of dissolved carbon compounds and 90% by weight of $H_2SO_4$ was treated with liquid ammonia at a temperature below 125° F. without decomposition of the dissolved carbon compounds to form a product including a slurry of ammonium sulfate crystals in ammonia and a solution of ammonia soluble compounds. Ammonium sulfate crystals were recovered and found to contain only 0.12% by weight of carbon. The solution of ammonia soluble compounds was evaporated to separate ammonia therefrom and also an amber colored viscous liquid having a characteristic acid odor.

In another operation a sulfuric acid sludge, resulting from the treatment of a xylene fraction with strong sulfuric acid, which had a total carbon content of 21% by weight was admixed with anhydrous liquid ammonia at a temperature below 125° F. A product was formed including a slurry of substantially white ammonium sulfate crystals in a liquid ammonia solution of ammonia soluble carbon compounds. The ammonium sulfate was recovered and found to contain only 0.15% by weight of carbon and to possess no odor.

The solution of ammonia soluble carbon compounds was subjected to evaporation and ammonium sulfonates of a dark amber color and of a brittle nature were recovered. These ammonium sulfonates are useful as wetting or emulsifying agents.

The nature and objects of the present invention having been completely described and illustrated, what I wish to claim as new and useful and to secure by Letters Patent is:

1. A method for producing ammonium sulfate from sulfuric acid sludge containing dissolved carbon compounds which comprises introducing said sulfuric acid sludge into a body of anhydrous liquid ammonia maintained in a reaction zone at a reaction temperature below 125° F. reacting said sulfuric acid sludge and anhydrous liquid ammonia to form ammonium sulfate crystals, maintaining unreacted liquid ammonia in the reaction zone at all times and washing the ammonium sulfate crystals formed in the reaction zone continuously with said unreacted anhydrous liquid ammonia, removing from said reaction zone as product a slurry of ammonium sulfate crystals in a liquid ammonia solution of ammonia soluble carbon compounds, said slurry containing at least one volume of unreacted ammonia for each volume of sulfuric acid sludge charged to the reaction zone to form the ammonium sulfate crystals in said slurry and separating ammonium sulfate crystals substantially free of carbon from said slurry.

2. A method in accordance with claim 1 in which liquid ammonia is evaporated from the reaction zone to maintain the reaction temperature within the range of 100° to 125° F.

3. A method in accordance with claim 1 in which the ammonium sulfate crystals separated from the slurry are washed with liquid ammonia after the separation step.

4. A method for producing ammonium sulfate from sulfuric acid sludge containing dissolved carbon compounds and having a water content within the range of 1% to 2% which comprises introducing said sulfuric acid sludge into a body of anhydrous liquid ammonia maintained in a reaction zone at a temperature within the range of 100° to 125° F., said sulfuric acid sludge and anhydrous liquid ammonia being the only materials introduced into said reaction zone, reacting said sulfuric acid sludge and anhydrous liquid ammonia to form ammonium sulfate crystals, maintaining unreacted liquid ammonia in the reaction zone at all times and washing the ammonium sulfate crystals formed in the reaction zone continuously with said unreacted anhydrous liquid ammonia, removing from said reaction zone as product a slurry of ammonium sulfate crystals in a liquid ammonia solution of ammonia soluble carbon compounds, said slurry containing at least one volume of unreacted ammonia for each volume of sulfuric acid sludge charged to the reaction zone to form the ammonium sulfate crystals in said slurry, and separating ammonium sulfate crystals substantially free of carbon from said slurry.

5. A method in accordance with claim 4 in which liquid ammonia is evaporated from the reaction zone to maintain the reaction temperature within the range of 100° to 125° F.

6. A method in accordance with claim 4 in which the ammonium sulfate crystals separated from the slurry are washed with liquid ammonia after the separation step.

7. A method for producing ammonium sulfate from sulfuric acid sludge containing dissolved carbon compounds which comprises introducing said sulfuric acid sludge into a body of anhydrous liquid ammonia maintained in a reaction zone at a temperature within the range of 100 to 125° F. with the sulfuric acid sludge and anhydrous liquid ammonia in the reaction zone being in the proportion of three volumes of anhydrous liquid ammonia per volume of sludge, reacting said sludge and liquid ammonia to form ammonium sulfate crystals, maintaining unreacted ammonia in the reaction zone at all times and washing the ammonium sulfate crystals formed in the reaction zone continuously with said unreacted anhydrous liquid ammonia, evaporating liquid ammonia from said reaction zone to maintain the reaction temperature below 125° F., removing from said reaction zone as product a slurry of ammonium sulfate crystals in a liquid ammonia solution of ammonia soluble compounds, said slurry containing at least one volume of unreacted ammonia for each volume of sulfuric acid sludge charged to the reaction zone to form the ammonium sulfate crystals in said slurry and separating ammonium sulfate crystals substantially free of carbon from said slurry.

ALBERT J. SHMIDL.

References Cited in the file of this patent

UNITED STATES PATENTS

| Number | Name | Date |
|---|---|---|
| 1,310,306 | Sperr | July 15, 1919 |
| 1,346,106 | Bredlek | July 13, 1920 |
| 1,360,785 | Parrish | Nov. 30, 1920 |
| 2,022,813 | Ruys | Dec. 3, 1935 |
| 2,025,401 | Rutherford | Dec. 24, 1935 |
| 2,026,250 | Pyzel et al. | Dec. 31, 1935 |

FOREIGN PATENTS

| Number | Country | Date |
|---|---|---|
| 152,766 | Great Britain | Oct. 21, 1920 |
| 365,945 | Great Britain | Jan. 28, 1932 |
| 109,269 | Great Britain | Aug. 31, 1947 |

OTHER REFERENCES

Perry Chemical Engineer's Handbook, McGraw-Hill, N. Y. 1940, pages 429, 2551.